United States Patent
Greywall

(10) Patent No.: US 6,771,850 B1
(45) Date of Patent: Aug. 3, 2004

(54) ARTICLE COMPRISING A MEMS DEVICE AND METHOD THEREFOR

(75) Inventor: Dennis S. Greywall, Whitehouse Station, NJ (US)

(73) Assignees: Agere Systems Inc., Allentown, PA (US); Lucent Technologies Inc., Murray Hill, NJ (US)

( * ) Notice: Subject to any disclaimer, the term of this patent is extended or adjusted under 35 U.S.C. 154(b) by 448 days.

(21) Appl. No.: 09/715,575

(22) Filed: Nov. 18, 2000

(51) Int. Cl.[7] .................................................. G02B 6/26
(52) U.S. Cl. ............................ 385/17; 385/18; 359/223
(58) Field of Search ......................... 385/15–19, 23–25, 385/47; 359/223, 225, 226, 230, 872, 876, 877, 224, 298, 871; 257/98, 700; 438/26, 27, 29, 31, 64, 65, 66

(56) References Cited

U.S. PATENT DOCUMENTS

| | | | |
|---|---|---|---|
| 5,960,132 A | * | 9/1999 | Lin .............................. 385/18 |
| 6,236,491 B1 | * | 5/2001 | Goodwin-Johansson .... 359/291 |
| 6,388,789 B1 | * | 5/2002 | Bernstein .................... 359/198 |
| 6,411,753 B1 | * | 6/2002 | Ao .............................. 385/17 |
| 6,415,070 B1 | * | 7/2002 | Munoz-Bustamante et al. ............................ 385/24 |
| 6,586,841 B1 | * | 7/2003 | Daneman et al. ........... 257/774 |
| 2001/0046346 A1 | * | 11/2001 | Burns .......................... 385/18 |

* cited by examiner

*Primary Examiner*—David V. Bruce
*Assistant Examiner*—Chih-Cheng Glen Kao

(57) ABSTRACT

An article comprising a support portion that is coupled to an element portion, both of which portions are formed from some of the layers of a multi-layer substrate. In one embodiment, the support portion comprises a torsional member, an actuating plate and a beam, wherein the beam mechanically links the actuating plate and the element portion. At least one torsional member attaches the support portion to the multi-layer substrate and allows the element portion to move independently of the substrate, such as when actuated by an underlying electrode. When actuated, the actuating plate of the support portion is drawn toward the underlying electrode while the element portion rises from a first (unactuated) position within the substrate toward a second (actuated) position outside of the substrate, in see-saw like fashion. The present article is useful in a variety of applications, such as, for example, optical applications where it can be used to form improved chopper switches and optical cross connects.

21 Claims, 7 Drawing Sheets

ARTICLE COMPRISING A MEMS DEVICE AND METHOD THEREFOR

FIELD OF THE INVENTION

The present invention relates generally to microelectromechanical systems ("MEMS") devices. More particularly, the present invention relates to a MEMS device that is movable between a first position located within a multi-layer substrate and a second position that is located outside of the substrate.

BACKGROUND OF THE INVENTION

MEMS technology is becoming ubiquitous. MEMS accelerometers, pressure sensors, and even MEMS-based electrical components have been developed for use in a wide variety of applications.

Presently, some of the most important applications for MEMS are in the area of optical communications, wherein MEMS-based optical modulators, switches, attenuators, filters and like devices have been developed. While MEMS technology is very well suited for optical communications applications, integrating MEMS devices into such systems does present certain challenges. In particular, to process an optical signal via a MEMS device, the MEMS device must typically capture or engage the optical signal in a region of space that is "out-of-the-plane" relative to the substrate layer of the MEMS device. In other words, a raised or three-dimensional MEMS component is required to capture the signal.

Such components have traditionally been fabricated as "flip-up" structures that incorporate micro-hinges. Flip-up structures are formed by (1) fabricating hinged plates that lie on a base or substrate layer; (2) raising the hinged plates by rotating them about their micro-hinges; and (3) locking the hinged plates into the raised position. See, e.g., U.S. Pat. Nos. 5,923,798 and 5,963,367; Pister et al., "Microfabricated Hinges," Sensors and Actuators A, vol. 33, pp 249–256 (June 1992); Lee et al., "Surface-Micromachined Free-Space Fiber Optic Switches with Integrated Microactuators for Optical Fiber Communication Sytsems," Transducers '97, 1997 Int'l. Conf. Solid-State Sensors and Actuators, Chicago, Jun. 16–19, 1997, pp 85–88, and Reid et al., "Automated Assembly of Flip-Up Micromirrors," Transducers '97, 1997 Int'l. Conf. Solid-State Sensors and Actuators, Chicago, Jun. 16–19, 1997, pp 347–350.

While flip-up optical MEMS structures represent a tremendous advance over earlier bulk devices having moving parts, they nevertheless suffer from certain drawbacks.

For instance, many of the MEMS foundries offer fabrication processes that use alternating layers of oxide and polysilicon to form the various plates and other elements of a MEMS structure. Typically, the polysilicon layers exhibit compressive stress that can cause the fabricated elements to warp. Warped elements can cause assembly and operational problems. Additionally, flip-up structures must be assembled. In some cases, processing steps and structures are required for no reason other than to drive the assembly process.

Furthermore, optical applications often have stringent placement tolerances (e.g., for single mode fiber, etc.). Due to the nature of (i.e., the "play" in) micro-hinges, rotating a plate or other hinged element into a precise position is problematic. Moreover, once a hinged element is moved to a desired position, it must be locked in place. The locking mechanism is often realized as an additional notched plate that is rotated into interlocking engagement with the hinged element. Again, the notched plate represents additional fabrication and assembly steps.

The art would therefore benefit from an article that offers the functionality of the flip-up structures of the prior art but avoids at least some of their drawbacks.

SUMMARY OF THE INVENTION

The present invention is directed to a MEMS device that avoids some of the drawbacks of the prior art. The present MEMS device, which is fabricated from a multi-layer substrate, comprises a support portion coupled to an element portion. In some embodiments, the MEMS device is configured as an optical switching element, wherein, for example, the element portion is physically adapted to receive and reflect an optical signal. It is to be understood, however, that such embodiments are merely illustrative; in other embodiments, the present MEMS device is suitably used as other than an optical switching element.

The multi-layer substrate that forms the present MEMS device has at least a first layer, a second layer and an intermediate layer that separates the first and second layers. In accordance with the present teachings, the element portion of the MEMS device is fabricated from the second layer of the multi-layer substrate. Furthermore, it is particularly advantageous if the element portion has a major surface that is defined by the thickness of the second layer of the multi-layer substrate. When formed this fashion, the element portion itself is substantially orthogonal to the major surface of the surrounding multi-layer substrate.

In one embodiment, the multi-layer substrate is a silicon-on-insulator wafer. The support portion is advantageously formed from the top, relatively thin silicon layer of the silicon-on-insulator insulator wafer, while the element portion is formed from the bottom, relatively thick silicon layer of the wafer.

In some embodiments, the support portion of the MEMS device includes an actuating plate, one or more torsional members and a beam. The beam advantageously rigidly couples the actuating plate to the element portion. The torsional members, which depend from the beam, are coupled to the first layer of the multi-layer substrate (from which the torsional members are formed). The MEMS device is therefore supported, via the torsional members, from the multi-layer substrate. The torsional members are operative to twist, thereby allowing the MEMS device to move (e.g., rotate, etc.) independently of the multi-layer substrate.

The actuating plate and the element portion, which depend from the beam, are disposed on opposite sides of an axis of rotation that is aligned with the torsional members (i.e., the axis of rotation of the beam). Furthermore, the actuating plate is advantageously rigidly coupled to the element portion. This configuration functions as a mechanism by which at least some of the element portion formed from the second layer is raised "above" the first layer of the substrate.

Specifically, in a first position, the element portion is disposed within the multi-layer substrate. In some embodiments, the first position results when the MEMS device is in an unactuated state (i.e., no potential difference between the actuating plate and the underlying electrode). In an actuated state, a potential difference is created across the actuating plate and the electrode, thereby generating an electrostatic force of attraction therebetween. When the electrostatic force exceeds the restoring force of the torsional members, the actuating plate moves toward the underlying electrode such that the beam rotates about its axis of rotation. As the actuating plate moves downwardly toward the electrode, the element portion moves upwardly out of the multi-layer substrate to a second position in seesaw-like fashion. When the actuating force is removed, the element portion drops back within the multi-layer substrate to the first position.

The term "restoring force," as used herein, is the force of the torsional elements that must be overcome in order to move the element portion from its unactuated state to its actuated state. The term "unactuated state," or "first position" as used herein, refers to when the element portion is within (i.e., beneath the surface of) the multi-layer substrate. The term "actuated state," or "second position," as used herein, refers to when the element portion is outside (i.e., above the surface) of the multi-layer substrate.

In the context of an optical switching element, the element portion is used to direct an optical signal. For example, in one embodiment, the two optical fibers are positioned end-to-end, with a gap between the ends, over the multi-layer substrate. The element portion of the present MEMS device is aligned with the gap between the fiber ends. When the MEMS device is in the first position within the multi-layer substrate, the optical signal is able to pass from the first fiber to the second fiber. When, however, the MEMS device is actuated, the optical signal does not pass from the first fiber to the second fiber since the element portion is raised above the surface of the multi-layer substrate and into the path of the optical signal.

In such embodiments, the element portion is configured and placed to direct the optical signal either back to the input source of the optical signal (i.e., the input fiber or input waveguide) or to a different fiber or waveguide. Thus, the optical switching element is used to either redirect or reflect the optical signal.

DETAILED DESCRIPTION OF THE INVENTION

Structure and Operation of the Present MEMS Device

Figure 1:
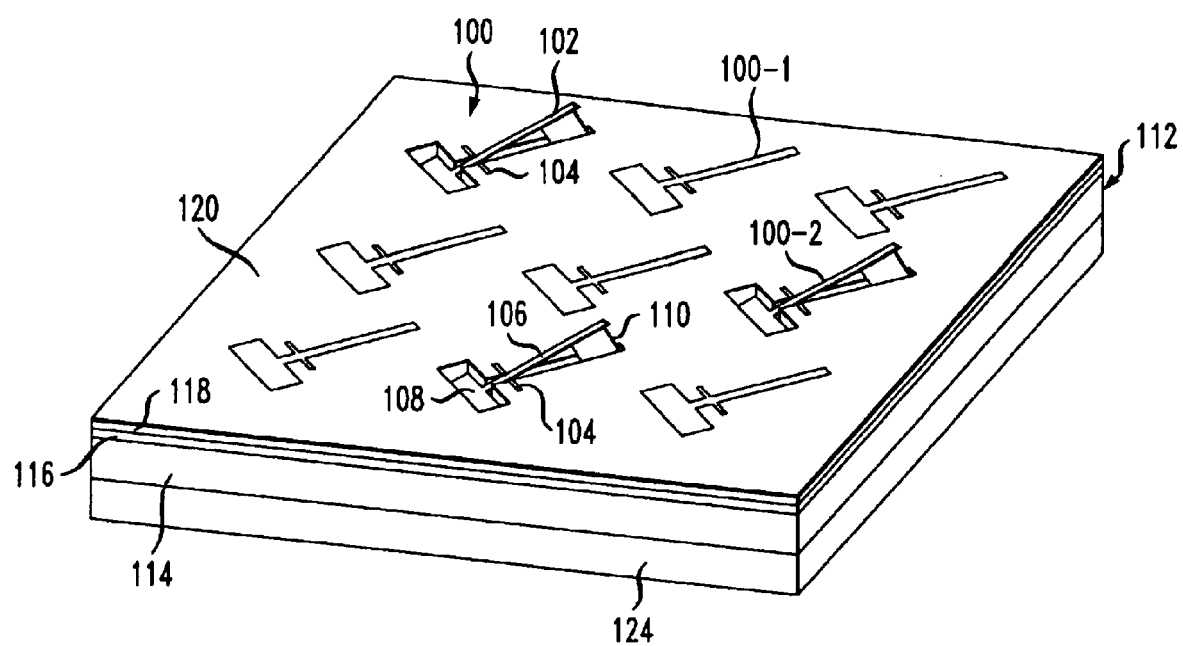
FIG. 1 depicts an n×n array of MEMS devices in accordance with the illustrative embodiment of the invention.

FIG. 1 depicts a n×n array of MEMS devices 100 in accordance with the illustrative embodiment of the present invention. For the illustrative array depicted in FIG. 1, n equals 3. That is, there are three columns and three rows of MEMS devices 100. It will be understood that in other embodiments of the n×n array, n is less than 3, and in still further embodiments, n is greater than 3. As described later in this Specification, the illustrative n×n array of MEMS devices can function as an optical cross connect, among other uses.

Figure 2:
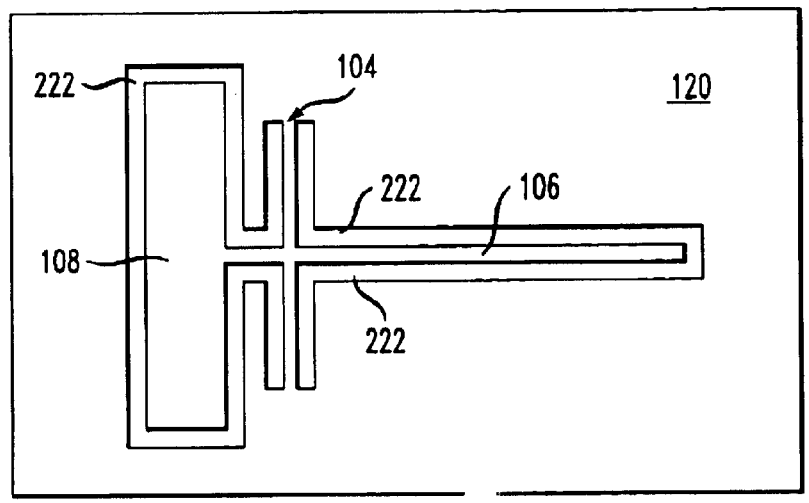
FIG. 2 depicts a top view of an illustrative embodiment of one of the MEMS devices of FIG. 1.
Figure 3:
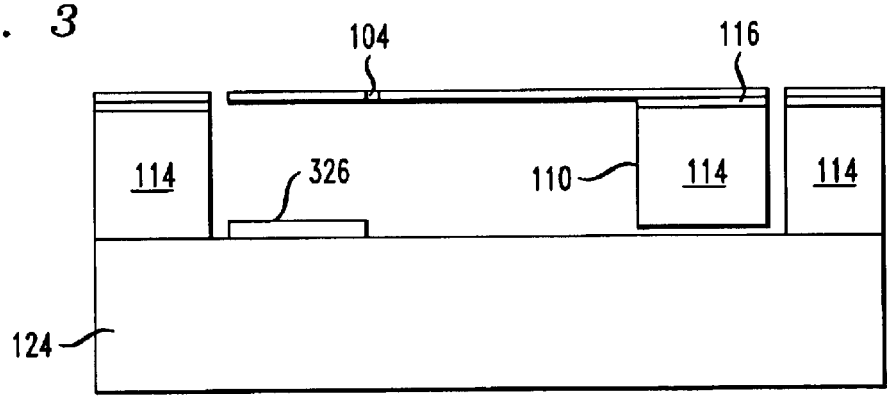
FIG. 3 depicts a side cross-sectional view of the MEMS device of FIG. 2, wherein the MEMS device is in an unactuated state.
Figure 4:
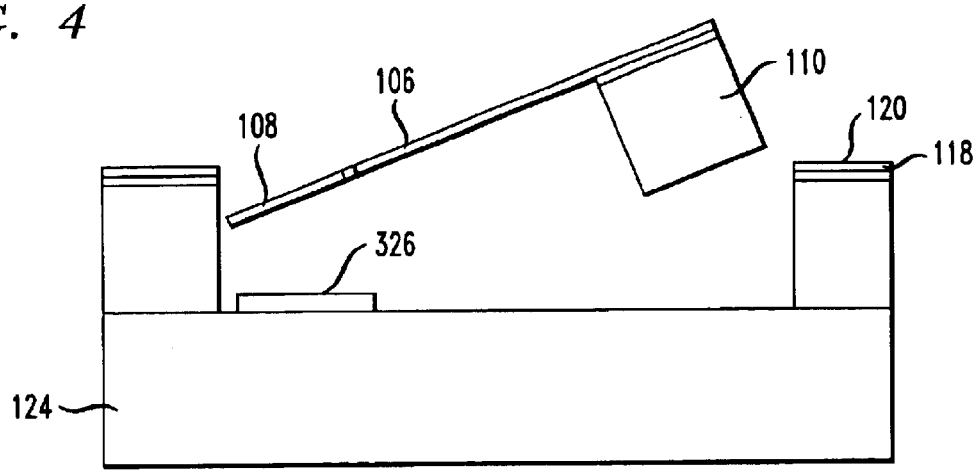
FIG. 4 depicts the side cross-sectional view of FIG. 3, but when the MEMS device in an actuated state.

A first embodiment of a MEMS device 100 is depicted in FIGS. 2–4. FIG. 2 depicts a top view of MEMS device 100, while FIGS. 3 and 4 depict cross-sectional side views.

With reference to FIGS. 1–4, each MEMS device 100 comprises a support portion 102 and element portion 110 (FIG. 1) that are substantially separated from multi-layer substrate 112 by trench 222 (FIG. 2).

In the illustrative embodiment, support portion 102 comprises torsional members 104, beam 106 and actuating plate 108. Torsional members 104 rotatably couple MEMS device 100 to multi-layer substrate 112. Torsional members 104 depend from beam 106 at a location between actuating plate 108 and element portion 110. Torsional members 104 create a "pivot point" along beam 106 between actuating plate 108 and element portion 110 about which beam 106 rotates in the manner of a "see-saw" when suitably actuated.

In some embodiments, multi-layer substrate 112 comprises three layers, including a bottom, relatively thick layer 114 (also referred to herein as the "second layer"), an intermediate, relatively thin layer 116 disposed on bottom layer 114, and a top, relatively thin layer 118 (also referred to herein as the "first layer") disposed on intermediate layer 116. As described in more detail later in this Specification, MEMS device 100 is advantageously formed from some of the layers comprising multi-layer substrate 112.

MEMS devices 100 are movable between two states or positions that are depicted in FIG. 1. In particular, in a first position illustrated by MEMS device 100-1, a MEMS device resides substantially within multi-layer substrate 112. More particularly, the upper surface of MEMS devices 100 (i.e., the upper surfaces of torsional members 104, actuating plate 108 and beam 106) is co-planar with upper surface 120 of multi-layer substrate 112, while element portion 110 resides within multi-layer substrate 112. In the second position, which is illustrated by MEMS device 100-2, a portion of the MEMS device, predominantly element portion 110, is disposed above upper surface 120 of multi-layer substrate 112.

For clarity and for the purposes of exposition, when MEMS device 100 is in the first position, it (and/or element portion 110) is referred to herein as being "within" or "in" multi-layer substrate 112. When MEMS device 100 is in the second position, it (and/or element portion 110) is referred to herein as being "outside" of multi-layer substrate 112.

In the illustrative embodiments, the movement of element portion 110 between the first and second positions results from the combined action of torsional members 104, actuating plate 108 and electrode 326 (see FIG. 3) that is disposed on electrode layer 124 that abuts bottom multi-layer substrate 114.

In particular, in the absence of an actuating force, element portion 110 remains in the first position within multi-layer substrate 112. This state is illustrated, via a cross-sectional view, in FIG. 3. When a potential difference is created across electrode 326 of electrode layer 124 and actuating plate 108, an electrostatic force is generated therebetween. This force draws actuating plate 108 toward electrode 326. As this occurs, and in response thereto, element portion 110 rises above upper surface 120 of multi-layer substrate 112, as is depicted in FIG. 4.

In the embodiment depicted in FIGS. 1–4, torsional members 104 twist to allow the MEMS device 100 to rotate relative to multi-layer substrate 112 allowing actuating plate 108 to move toward electrode 326. In other embodiments, other support arrangements (i.e., other than torsional members) for movably coupling MEMS device 100 to multi-layer substrate 112 may suitably be used.

Illustrative Fabrication Method

As indicated above, the present MEMS devices are advantageously formed from substrate 112, itself. To this end, substrate 112 comprises several layers, such as layers 114, 116 and 118 that are depicted in FIGS. 1–4.

The present MEMS devices can of course be fabricated in a wide variety of configurations to satisfy the requirements of a particular application. It will be appreciated that, as a function of MEMS device configuration, the thickness of the layers of the multi-layer substrate, and even the arrangement of the layers, might vary from the guidelines provided below for the illustrative configuration. It is within the capabilities of those skilled in the art to modify the nominal thicknesses and the arrangement of the various layers of the multi-layer substrate as is necessary or desirable to satisfy the requirements of any particular application.

For the MEMS devices described herein, suitable multi-layer substrates advantageously comprise at least three layers, including a first layer (e.g., top, relatively thin layer 118), a second layer (e.g., bottom, relatively thick layer 114), and an intermediate, relatively thin layer (e.g., layer 116) that is sandwiched between the first and second layers. The first (top) layer and intermediate layer each have a thickness that is in the range of about 1 to 2 microns. The second layer has a thickness in the range of about 300 to 700 microns.

In accordance with the present teachings, the second layer, which in the illustrative embodiments is the bottom, relatively thick layer, is used to form element portion 110. The "height" (from the perspective of FIGS. 3 and 4) of a major surface of element portion 110 (i.e., the surface that is depicted in the cross sectional views of FIGS. 3 and 4) is advantageously defined by the thickness of the bottom layer (e.g., layer 114) of the multi-layer substrate. For simplicity of description, this major surface is referred to herein as the "working surface" of element portion 110.

The relatively first layer, which in the illustrative embodiments is the top, relatively thin layer, is used to form support portion 102 of MEMS device 100, including actuating plate 108, torsional members 104 and beam 106. The intermediate layer serves as an etch/milling stop between the two layers. While it is possible to fabricate a MEMS device without the use of an etch-stop (ie., the intermediate layer), it is substantially more difficult to control the extent of the etching/milling step without it.

The top and bottom layers of multi-layer substrate 112 comprise, without limitation, silicon or polysilicon. Since the intermediate layer functions as a "stop-etch" layer, it must therefore comprise a material that resists being etched by processes that will readily etch the top and bottom layers. For instance, if silicon or polysilicon is used for the top and bottom layers, silicon oxide is advantageously used for the intermediate layer.

In one particularly advantageous embodiment, multi-layer substrate 112 comprises a silicon-on-insulator ("SOI") wafer. Such wafers typically comprise a bottom bulk or "thick" silicon layer (about 500 to 700 microns in thickness as a function of wafer diameter), an oxide layer (about 0.2 to 3 microns in thickness) disposed thereon, and a "thin" silicon layer (about 0.1 to 10 microns) that is disposed on top of the oxide layer. The arrangement and thickness of such layers are consistent with the nominal ranges for layer thickness that have been previously provided. SOI wafers are commercially available from SOITEC USA, Inc. of Peabody, Mass. and others.

When fabricating MEMS devices 100 using a SOI wafer, torsional members 104, beam 106 and actuating plate 108 are advantageously formed from the thin silicon layer and element portion 110 is advantageously formed from the thick silicon layer. In some embodiments, a SOI wafer (in particular, the thick silicon layer) having a <110> crystal orientation is used. In such embodiments, the wafer can be oriented so that the working surface of element portion 110 is an atomically flat <111> surface. Since each element portion 110 comprises a section of the same single crystal silicon, the working surface of the element portion of each MEMS device 100 in an array of such devices are parallel to one another to a high degree of accuracy.

The ability to precisely align the element portions and provide exceedingly smooth, flat surfaces is particularly advantageous for optical applications, a few of which are described later in this Specification.

A method for making a MEMS device is now described in conjunction with FIGS. 5–8. The illustrative fabrication method utilizes standard patterning and etching techniques (e.g., photolithographic processing, etc.) Since these techniques are commonplace in the art, they will be referenced without explanation.

Figure 5:
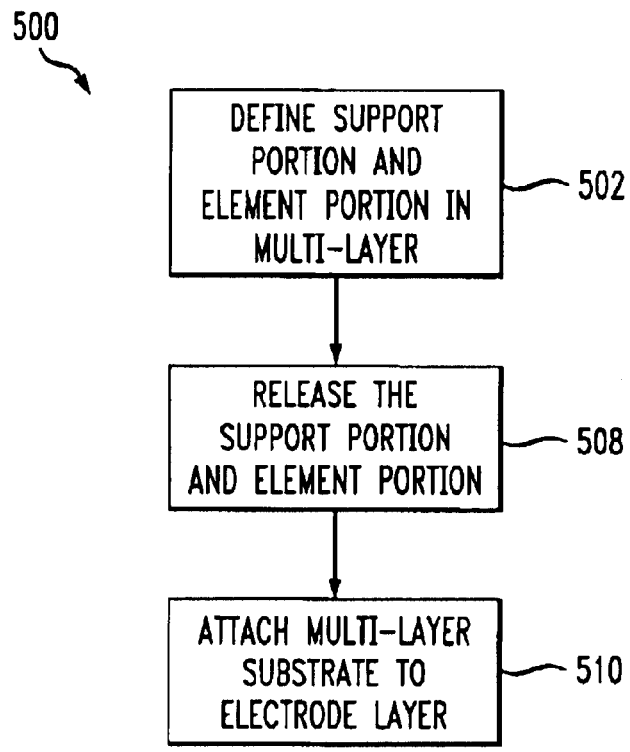
FIG. 5 depicts a flow diagram of a method for making a MEMS device in accordance with the present teachings.
Figure 6:
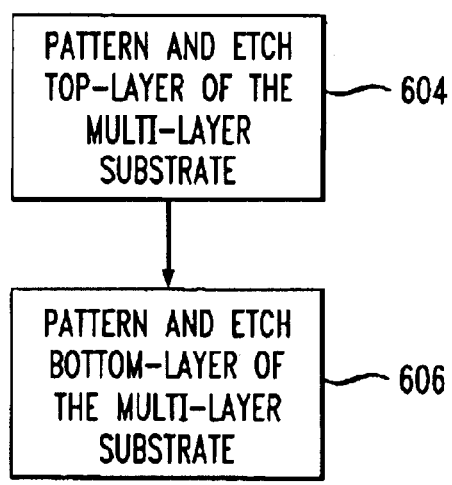
FIG. 6 depicts a method for carrying out one of the operations in the method depicted in FIG. 5.

In accordance with operation 502 of method 500 depicted in FIG. 5, support portion 102 is defined in a multi-layer substrate 112. In one embodiment, operation 502 is carried out via steps 604 and 606 depicted in FIG. 6. In particular, support portion 102 is defined by appropriately patterning and etching the top layer (i.e., layer 118) of the multi-layer substrate (step 604), and by appropriately patterning and etching the bottom layer (i.e., layer 114) of the multi-layer substrate (step 606).

Figure 7:
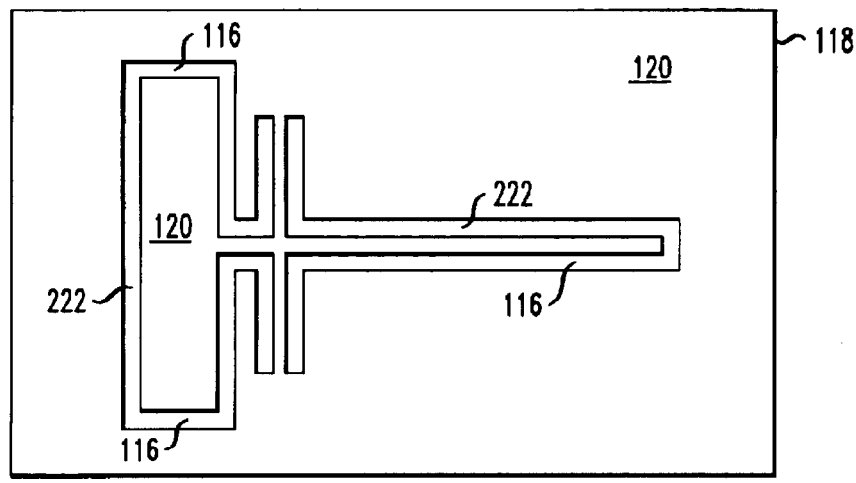
FIG. 7 depicts the processing of the top side of a SOI wafer during the fabrication of a MEMS device in accordance with the present teachings.

FIG. 7 depicts a view of top layer 118 after etching and patterning in accordance with step 604. After patterning, top layer 118 is etched (e.g., via reactive ion etching, etc.) such that trench 222, which substantially encompasses or surrounds support portion 102, extends "down" to intermediate layer 116. Trench 222 defines the shape of actuating plate 108, torsional members 104 and beam 106.

Figure 8:
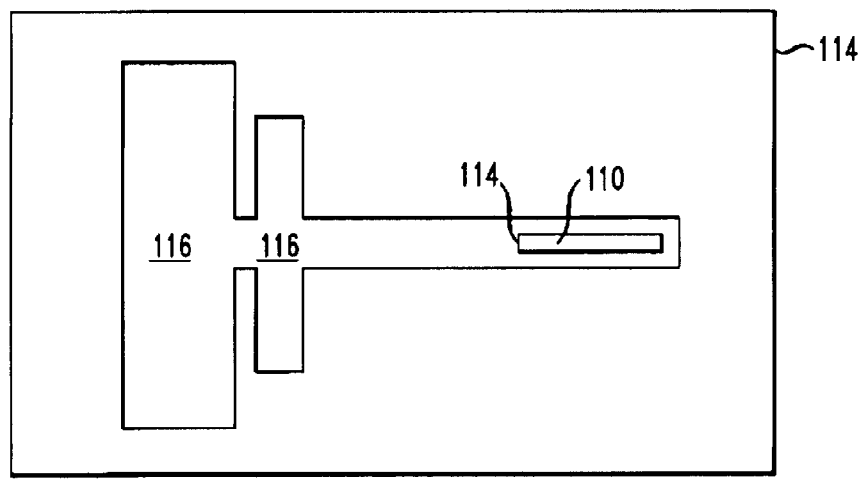
FIG. 8 depicts the processing of the bottom side of a SOI wafer during the fabrication of a MEMS device in accordance with the present teachings.

FIG. 8 depicts a view of bottom layer 114 after etching and patterning in accordance with step 606. After patterning, bottom layer 114 is etched (e.g., via DRIE, laser milling, etc.) "up" to intermediate layer 116. A thin "slice" of layer 114 is masked such that it remains after etching. That slice becomes, in the illustrative embodiment, element portion 110. And the thickness of layer 114 defines the "height"

(from the perspective of FIGS. 3 and 4) of the working surface of element portion 110.

Bottom layer 114 advantageously comprises silicon having a <110> crystal orientation, which can be oriented so that the working surface (i.e., the vertical face) of element portion 110 comprises <111> facets. After etching, element portion 110 is washed (e.g., KOH, etc.) to clean the <111> facets.

After defining the MEMS device 100 as per operation 502, it is released, as per operation 508. In the illustrative embodiment of the present method, release is effected by removing the portions of intermediate layer 116 that are exposed due to the previous etching steps. Bottom layer 114 of multi-layer substrate 112 is then bonded, in operation 510, to a second substrate (e.g., substrate 124 of FIGS. 1, 3, 4) that is patterned with electrodes. Top layer 118 and bottom layer 114 of multi-layer substrate 112, and the portions of MEMS device 100 formed from those layers, are electrically grounded.

Physical Design Example

Figure 9:
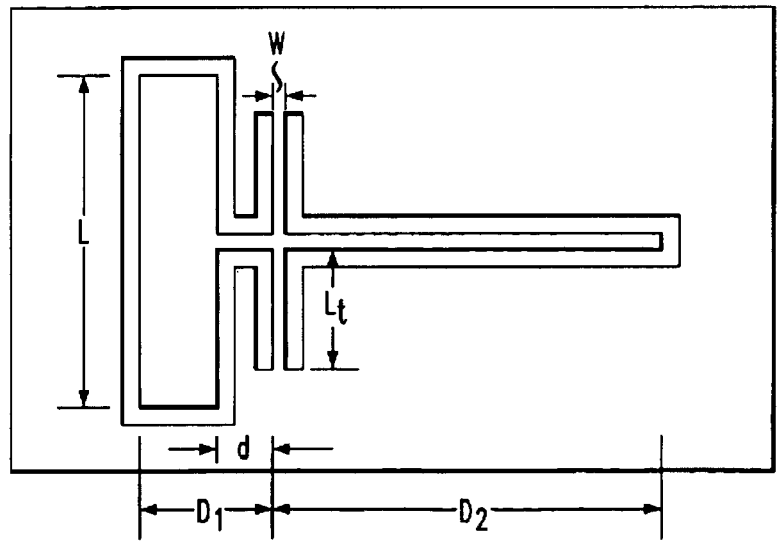
FIG. 9 depicts dimensional parameters of a MEMS device for use in conjunction with a physical design example.

A MEMS device 100 is to be fabricated from a SOI wafer comprising a thin silicon layer having a thickness t and a thick silicon layer having a thickness $t_0$. With reference to FIG. 9, other length parameters include length L of actuating plate 108, the length $L_t$ of torsional members 104, the width w of torsional members 104, the distance d between the center of torsional members 104 and the leading edge of actuating plate 108, the distance $D_1$ between the center of torsional members 104 and the trailing edge of actuating plate 108 and the distance $D_2$ between the center of torsional members 104 and the end of beam 106 or element portion 110.

Assuming further that $d/D_1 < 0.2$, $L = 2D_1$ and that $w = t$, then the voltage $V_c$ and the corresponding rotation angle $\theta_c$ at which snap down (i.e., electrostatic instability) occurs are given by:

$$V_c \approx 2.6 \times 10^4 [(tt_0^{1.5})/(L_t^{0.5} D_1^2)] \quad [1]$$

$$\theta_c \approx 25.2 t_0/D_1 \quad [2]$$

where: length/distance is measured in microns and angle is measured in degrees.
Given:
thin silicon layer thickness t=2 microns;
thick silicon layer thickness $t_0$=200 microns; and
the distance $D_1$=400 microns, then:

$$V_c = 1810/L_t^{0.5}; \text{ and} \quad [3]$$

$$\theta_c = 12.6°. \quad [4]$$

So, if $L_t$=200 microns, then:

$$V_c = 128 \text{ volts}. \quad [5]$$

Assuming that the maximum working voltage $V_{mw}$ would be ninety percent of $V_c$, then:

$$V_{mw} = 115 \text{ volts}. \quad [6]$$

Figure 10:
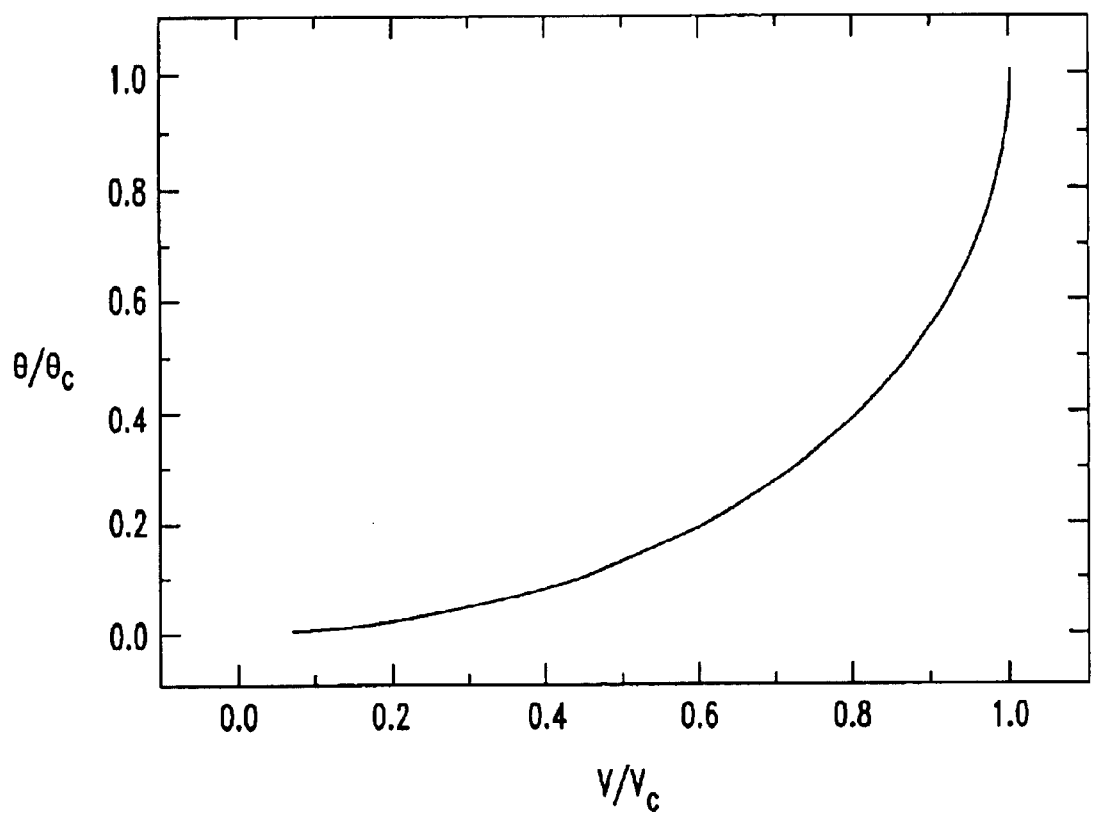
FIG. 10 depicts a plot of reduced actuation voltage versus reduced rotation angle.

It is seen from FIG. 10, which is a plot of $\theta/\theta_c$, that when $V/V_c = 0.9$, then:

$$\theta/\theta_c \approx 0.55. \quad [7]$$

Therefore, for a maximum working voltage of $0.9V_c$, the maximum working rotation angle $\theta_{mw}$ is:

$$\theta_c = 7°. \quad [8]$$

If the distance $D_2$=800 microns, then the outside edge of element portion 110 is raised a distance of 800 tan 7° or 100 microns above surface 120 of multi-layer substrate 112.

Illustrative Optical Applications

As previously indicated, the present MEMS device is well suited for optical applications, among other uses. Two of such optical applications are described below.

1. Chopper Switch

In a very simple optical application, an on/off switch is created by positioning a movable plate such that it can be moved into or removed from the path of an optical signal that is traveling between two waveguides. See, e.g., U.S. Pat. No. 5,923,798. Such switches are often referred to as "chopper" switches. An improved version of a chopper switch in accordance with the present invention is depicted in FIGS. 11–12.

Figure 11:
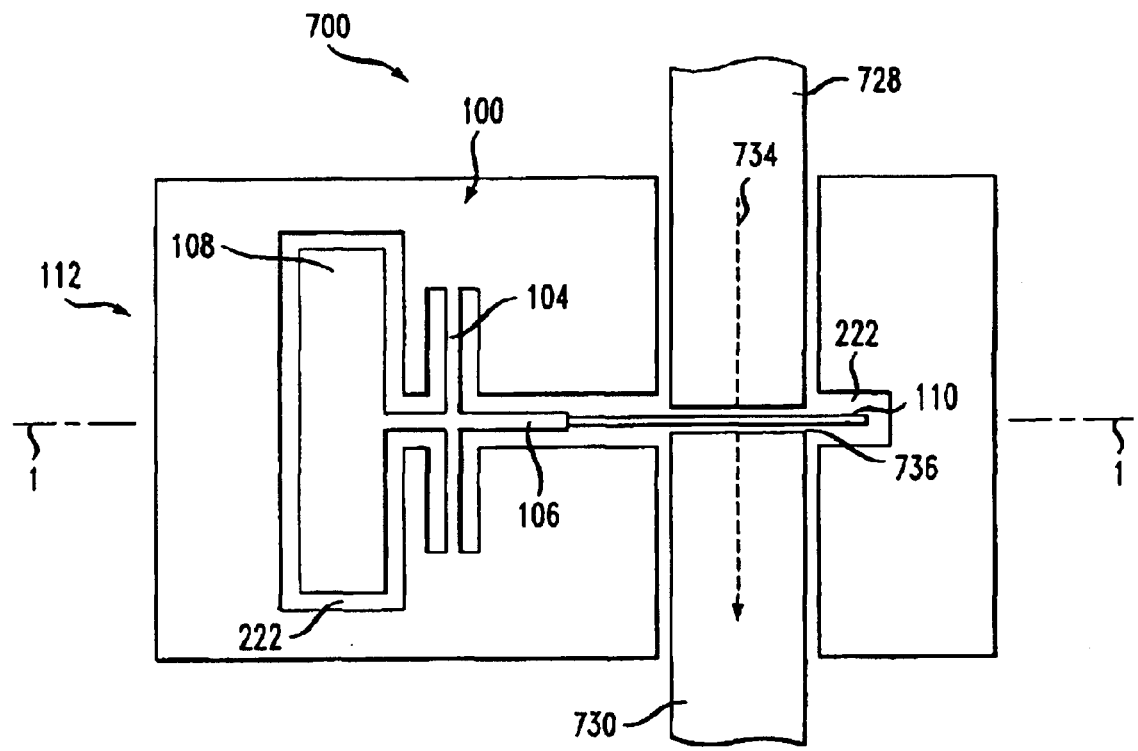
FIG. 11 depicts a top view of an improved chopper switch in accordance with the present teachings.

FIG. 11 depicts a top view of improved chopper switch 700. In accordance with the present teachings, chopper switch 700 includes two optical waveguides (e.g., fibers, etc.) 728 and 730 that are disposed end-to-end and separated by gap 736. Chopper switch 700 also includes MEMS device 100 that is arranged so that the portion of trench 222 that houses element portion 110 is disposed beneath gap 736. The working surface of element portion 110 is advantageously highly reflective.

FIG. 11 depicts the cross state of switch 700 wherein optical signal 734 travels from waveguide 728, across gap 736, to waveguide 730. In the cross state, element portion 110 is within multi-layer substrate 112 and, therefore, does not impinge upon the path of optical signal 734.

Figure 12:
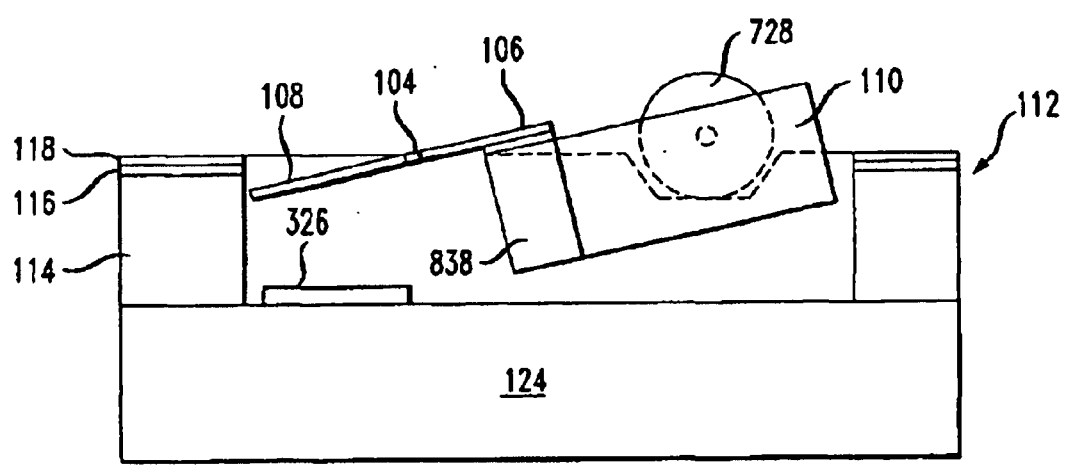
FIG. 12 depicts a cross-sectional side view of the chopper switch of FIG. 11 through line 1—1 of FIG. 11.

FIG. 12 depicts, via a side cross-sectional view through axis 1—1 of FIG. 11, the bar state of switch 700, wherein optical signal 734 does not cross (i.e., is "barred" from crossing) switch 700. In the bar state, the working surface of element portion 110 intercepts optical signal 734, thereby preventing it from entering waveguide 730. Switch 700 is placed in the bar state by actuating MEMS device 100, such as by applying a potential difference across electrode 326 and actuating plate 108, so that element portion 110 moves out of multi-layer substrate 112 and between waveguides 728 and 730.

The embodiment of MEMS device 100 depicted in FIGS. 11I and 12 (hereinafter "configuration B") for use in chopper switch 700 has a different configuration than MEMS device 100 illustrated in FIGS. 2–4 and 6–7 (hereinafter "configuration A"). In particular, in configuration A, bean 106 extends over element portion 110 (see, e.g., FIG. 4), while in configuration B, beam 106 does not extend over element portion 110 (see, e.g., FIG. 12).

The reason for this difference is that for a chopper switch it is usually advantageous to keep the size of gap 736 as small as possible. In this context, observe that beam 106 is wider than element portion 110. Consequently a relatively wider-sized gap would be required to accommodate the relatively greater width of beam 106 for a MEMS device having configuration A than for a MEMS device having configuration B.

A second difference between configuration A and configuration B of MEMS device 100 is the presence of, in configuration B, stabilization region 838. Stabilization region 838, which flares outwardly with increasing distance from element portion 110, provides additional rigidity to MEMS device 100. There is nothing unique to the chopper switch application that demands the presence of stabilization region 838; this feature is suitably incorporated into the present MEMS devices for use in a wide variety of applications.

Optical Cross Connect

Figure 13:
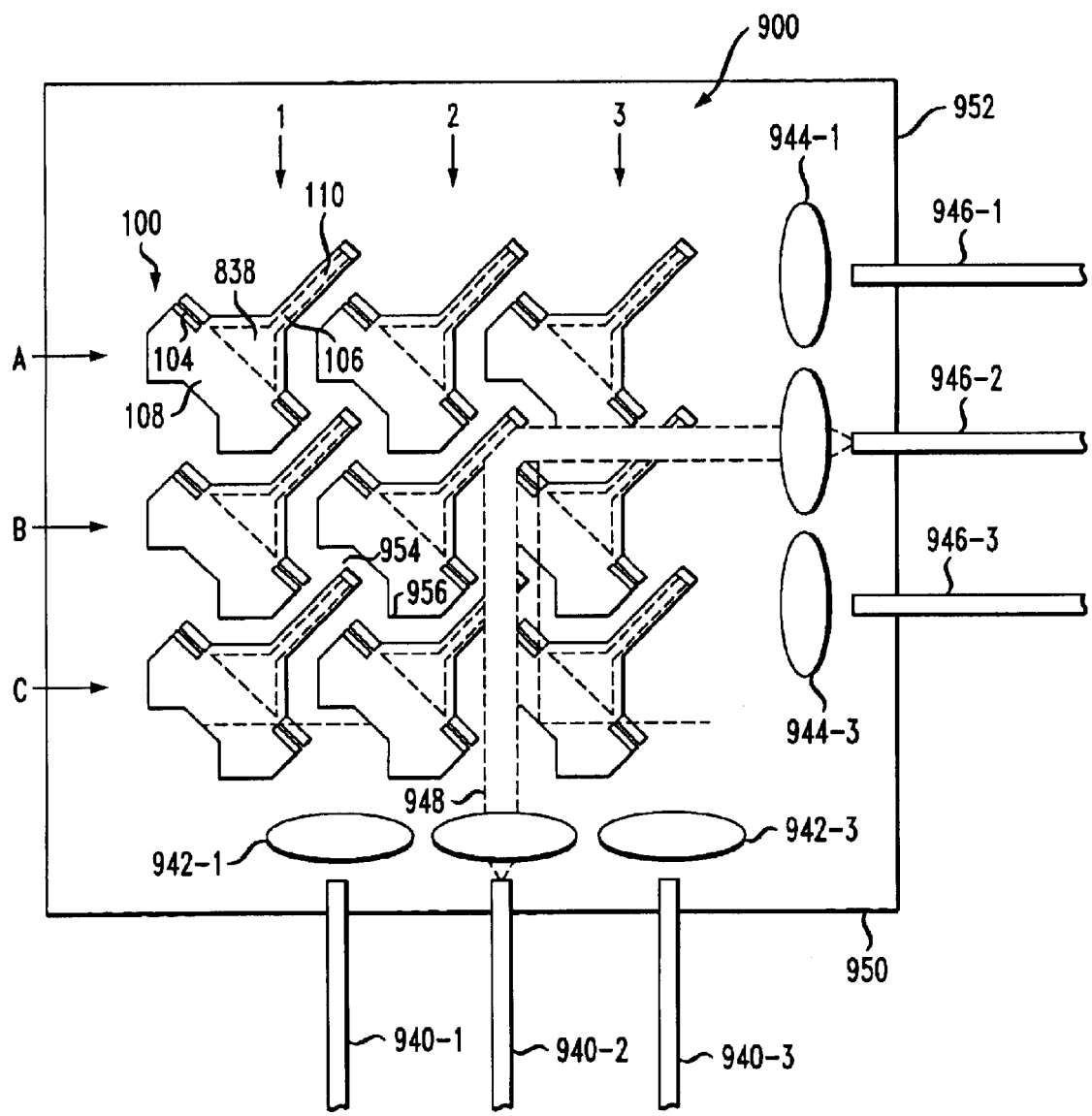
FIG. 13 depicts an optical cross connect comprising a n×n array of MEMS devices in accordance with the present teachings.

FIG. 13 depicts optical cross connect 900 in accordance with the present invention. Optical cross connect 900 comprises a n×n array of MEMS devices 100. In the embodiment depicted in FIG. 13, n=3, such that there are three columns of MEMS devices 100 (labeled columns 1, 2 and 3) and three rows of MEMS devices 100 (labeled A, B, C). It will be understood that in other embodiments of cross connect 900, n is less than 3, and in still further embodiments of cross connect 900, n is greater than 3.

An optical signal 948 is delivered to cross connect 900 by a first 1×n array of input waveguides 940-i, i=1, n. A second 1×n array of output waveguides 946-i, i=1, n, receives optical signal 948 from cross connect 900. In the embodiment depicted in FIG. 13, n=3 such that there are three input waveguides 940-1, 940-2 and 940-3, and three output waveguides 946-1, 946-2 and 946-3.

In the illustrative embodiment, a first 1×n array of lenses 942-i, i=1, n, is disposed between input waveguides 940-i and columns 1, 2 and 3 of MEMS devices 100. More particularly, one lens (e.g., 942-1) is disposed between each input waveguide (ie., waveguide 940-2) and the optically aligned column (ie., column 2) of MEMS devices 100. Similarly, a second 1×n array of lenses 944-i, i=1, n, is disposed between rows A, B and C of MEMS devices 100 and output waveguides 946-i. Lenses 942-i collimate the optical signal as it leaves the input waveguides 940-i, and lenses 944-i focus the optical signal into output waveguides 946-i.

By selectively actuating an appropriate MEMS device 100, optical cross connect 900 is operable to route an optical signal, which can be delivered via any one of the n input waveguides 940-i, to any one of the n output waveguides 946i. For example, in FIG. 13, optical signal 948, which is delivered by input waveguide 940-2, is routed to output waveguide 946-2 by actuating MEMS device (B, 2). If the signal were instead to be routed to output waveguide 946-3, then MEMS device (C, 2) must be actuated.

The MEMS devices 100 of cross connect 900 are actuated in the manner previously described by electrodes (not depicted in FIG. 13) that underlie the MEMS devices on an electrode wafer. Typically, each electrode will be individually connected, via a wire trace, to electrical contact pads that are disposed at the edge of electrode wafer. Such contact pads will be in electrical contact with a controlled voltage source that is operable to selectively apply voltage to an appropriate pad to actuate a desired electrode.

In cross connect 900, element portion 110 is oriented at 45 degrees with respect to sides 950 and 952. This is a consequence of the orientation (orthogonal) of the input and output waveguides relative to each other and of the orientation (orthogonal) of the waveguides with respect to sides 950 and 952.

The individual MEMS devices 100 of cross connect 900 have a structural configuration that is different than configurations A or B previously depicted and described. In particular, while MEMS devices 100 that are depicted in FIG. 13 possess the same elements as in the previous embodiments (i.e., torsional members 104, beam 106, actuating plate 108, element portion 110 and stabilization region 838), the shape of the MEMS device is different. More particularly, actuating plate 108 of the MEMS devices depicted in cross connect 900 has a shape that (1) facilitates close packing of MEMS devices and (2) prevents shorting if electrostatic snap-down occurs. In further detail, notch 954 in actuating plate 108 allows for closer packing, and points 956 contact electrode layer 124 rather than electrode 326 if snap-down occurs (see FIG. 4).

It is to be understood that the above-described embodiments are merely illustrative of the invention and that many variations may be devised by those skilled in the art without departing from the scope of the invention and from the principles disclosed herein. It is therefore intended that such variations be included within the scope of the following claims and their equivalents.

I claim:

1. An article comprising:
    a multi-layer substrate having a first and second layer and each having a thickness;
    a support portion defined from said first layer and having a length and an actuating end, and said support portion rotatably coupled to, said multi-layer substrate;
    an optical element portion coupled to and depending from an end of said support portion opposite said actuating end, said optical element having a length less than said length of said support portion and having a thickness substantially defined by said thickness of said second layer, said element portion is movable between:
        a first position within said multi-layer substrate below an exterior surface thereof, and
        a second position outside of said multi-layer substrate above said exterior surface thereof.

2. The article of claim 1 wherein said multi-layer substrate comprises an intermediate layer separating said first layer and said second layer.

3. The article of claim 1 wherein said support portion comprises a torsional member that is rotatably coupled to said first layer.

4. The article of claim 3 wherein said support portion further comprises a beam, wherein said optical element portion depends from said beam.

5. The article of claim 4 wherein a working surface of said optical element portion is physically adapted to receive an optical signal.

6. The article of claim 5 wherein said physical adaptation of said working surface is reflective, and further wherein said working surface is substantially orthogonal to said exterior surface of said multi-layer substrate.

7. The article of claim 6 wherein:
    said torsional member and said beam comprise a part of said first layer; and
    said optical element portion comprises a part of said second layer.

8. The article of claim 7 wherein a height of said working surface of said optical element portion is defined by a thickness of said second layer.

9. The article of claim 8 wherein said first layer and said second layer comprise silicon.

10. The article of claim 1 wherein said multi-layer substrate comprises a silicon-on-insulator wafer having a thin silicon layer overlying an insulating layer that overlies a thick silicon layer, and further wherein said thin silicon layer is said first layer; said insulating layer is an intermediate layer; and said thick silicon layer is said second layer.

11. The article of claim 1
    wherein said actuating end is an actuating plate; and
    said article further includes an electrode disposed in spaced relation with said actuating plate, wherein:

under an action of an applied potential difference, said electrode is operable to cause said actuating plate to move into said multi-layer substrate, which movement in turn causes said optical element portion to move towards said second position.

12. The article of claim 11 further comprising a first waveguide and a second waveguide that are disposed in orthogonal relation to one another, wherein:
when said optical element portion is in said first position, said first waveguide and said second waveguide are in optical communication with one another; and
when said optical element portion is in said second position, said first waveguide and said second waveguide are not in optical communication with one another.

13. The article of claim 12 wherein said article is an optical cross connect.

14. An article comprising a support portion that is defined from at least an outer first layer of a multi-layer substrate, said support portion having a length and an actuating end and an optical element portion coupled to and depending from said support portion and having a length less than a length of said support portion and being located at an end opposite said actuating end, said optical element further having a thickness that is substantially defined by a thickness of an inner second layer of said multi-layer substrate, wherein an interior of said multi-layer substrate is defined between a top surface of said first layer and a bottom surface of said second layer, and said optical element portion comprises a part of said second layer, wherein at least a portion of said optical element portion is movable between a first position in said interior of said multi-layer substrate and a second position above said top surface of said first layer.

15. The article of claim 14 wherein a working surface of said optical element portion is physically adapted to receive an optical signal, and further wherein said working surface is disposed in orthogonal relation to said top surface of said first layer.

16. The article of claim 15, wherein a height of said working surface is defined by a thickness of said second layer of said multi-layer substrate.

17. An article comprising:
an array having n columns and n rows of optical elements that are disposed in and rotatably coupled to a first layer of a multi-layer substrate;
a first 1×n array of optical waveguides, wherein each of said optical waveguides in said first array is aligned for optical communication with said optical elements in one of said n columns; and
a second 1×n array of optical waveguides disposed in orthogonal relation to said first array of optical waveguides, wherein each of said optical waveguides in said second array is aligned for optical communication with said optical elements in one of said n rows;
wherein, each optical element comprises:
an element portion that is defined from at least a second layer of said multi-layer substrate, said second layer having a thickness and said element portion having a thickness substantially defined by said thickness of said second layer, said element portion having an optical signal receiving surface that is disposed in orthogonal relation to a major surface of said multi-layer substrate;
a support portion having a length and defined from said first layer and rotatable coupled to said multi-layer substrate and having an actuating end, and said element portion having a length less than said length of said support portion and being coupled to and depending from said support portion at an end opposite to said actuating end, wherein said support portion allows said element portion to move independently of said multi-layer substrate; and
an electrode operable, under an action of an applied potential difference, to cause said element portion to move to between:
a first position wherein said element portion is within said multi-layer substrate; and
a second position wherein at least a portion of said element portion is above an exterior surface of said multi-layer substrate.

18. The article of claim 17 further comprising collimating/focusing lenses that are operable to collimate optical signals leaving said optical waveguides of said first and second arrays and to focus optical signals entering said optical waveguides.

19. The article of claim 17 wherein said multi-layer substrate comprises a silicon-on-insulator wafer having a thick silicon layer, a layer of oxide disposed on said thick silicon layer, and a thin silicon layer disposed on said layer of oxide.

20. The article of claim 19 wherein said element portion comprises a part of said thick silicon layer.

21. The article of claim 20 wherein said optical signal receiving surface of said element portion comprises facets having a <111> crystal orientation.

* * * * *